(No Model.)

S. D. G. NILES.
EGG CASE.

No. 350,442. Patented Oct. 5, 1886.

WITNESSES:
C. R. Davis
John S. Finch

INVENTOR:
S. D. G. Niles
C. M. Alexander
Attorney.

UNITED STATES PATENT OFFICE.

SINCLAIR D. G. NILES, OF TRIGONIA, TENNESSEE.

EGG-CASE.

SPECIFICATION forming part of Letters Patent No. 350,442, dated October 5, 1886.

Application filed August 3, 1886. Serial No. 209,857. (No model.)

*To all whom it may concern:*

Be it known that I, SINCLAIR D. G. NILES, a citizen of the United States, residing at Trigonia, in the county of Loudon and State of Tennessee, have invented certain new and useful Improvements in Egg-Cases, of which the following is a specification, reference being had therein to the accompanying drawings.

My invention relates to improvements in trays for transporting eggs, and the means for securing the eggs in the trays, and securing said trays in suitable conveying-boxes, the objects and purposes of which will be hereinafter more fully described.

Figure 1:
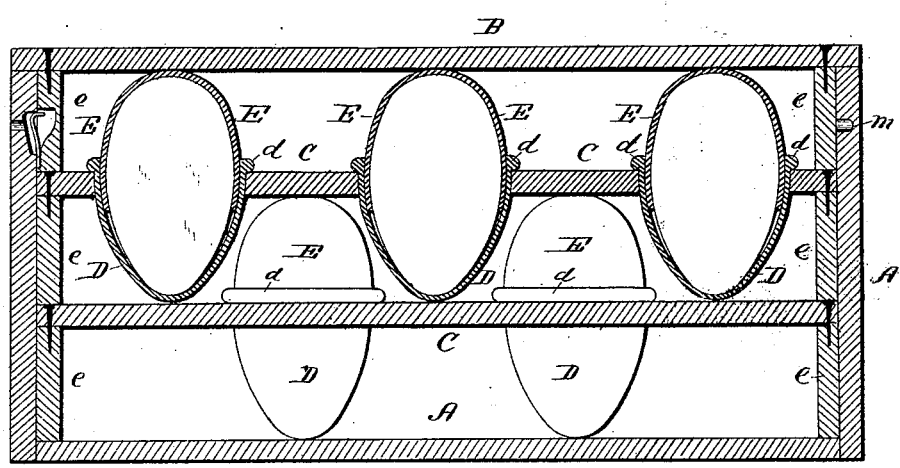
Figure 2:
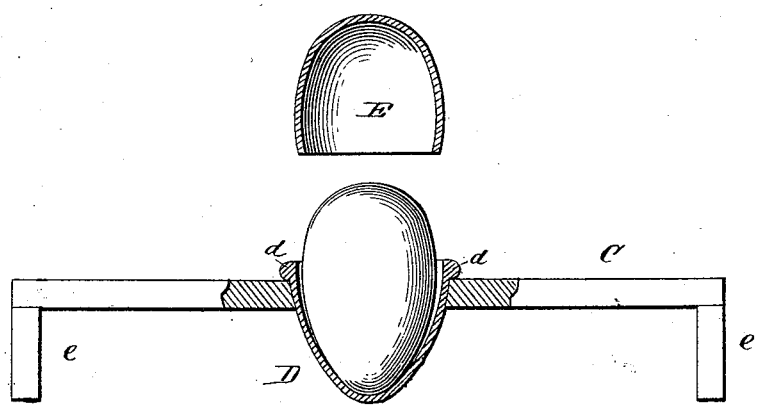

In the accompanying drawings, which make a part of this specification, Figure 1 represents a longitudinal section of the carrying-box, the partitions within same, and the cups or pouches which receive and retain the eggs. Fig. 2 represents one of the trays or partitions partly broken away, showing the cup in section, with cap raised and with egg in lower section of same.

In the figures, A represents a carrying-box of suitable dimensions, which is provided with a cover, B. Within the box are a series of trays or partitions, marked C. Both the cover and the trays are provided at their ends with dividing-boards e, which are intended to have a depth of about one-half the length of the egg. The dividing-boards of the cover are provided at one end of said cover with pins m, which enter recesses in the box, and at the other end with springs n, which also enter recesses in the box when the cover is closed down, and serve to keep the same in place. The pins act as hinges and the springs as catches. A small hole is made in the box opposite the spring, so that by inserting a small instrument the spring may be pushed inward and the cover thus released.

D represents a series of cups, which are pressed from paper or pulp of any suitable kind, and which rest in openings in the trays C C, made to receive them.

E E represent the caps of these cups, and the eggs are retained within them. The cups D D are provided at their mouths with outwardly-projecting flanges d. These flanges rest upon the trays around the openings in them made to receive the cups, and serve to keep the cups in place. When the egg is placed in the cup, the cap E is pressed down over the upper or large end of said egg, the rim of the cap passing within the mouth of the cup, as represented in Fig. 1. This rim, resting within the cup, and between it and the egg, the cap is retained securely in position. The cups are so located in the trays that those of one tray will alternate with those of the next, and the trays are at such a distance apart that the bearings upon the tops and bottoms of the cups are uniform and sufficient to always keep them in position. As the cups are securely closed, no damage to the other stock can arise from the breakage of one or more of the eggs in the several trays, as the contents cannot escape.

I do not wish to limit myself to the combination of the egg-holders with the apertured trays for supporting them, as I contemplate using the egg-holders without the especially-adapted trays by simply packing them in a box or barrel with or without any other packing material. The flanges on the egg-cup D not only serve as supports, but serve as a means of grasping and holding the cup while the cap is being withdrawn. This is highly necessary when the egg is of unusual size, making the cap fit very tightly between the egg and cup, and requiring considerable force to withdraw it.

Having thus fully described my invention, what I claim as new, and desire to secure by Letters Patent, is—

An egg-holder consisting of a cup or pocket provided at its rim with an outwardly-extending supporting-flange, and a molded or pressed supporting-cap adapted to set over an egg, with its rim between the egg and the cup, substantially as and for the purpose specified.

In testimony whereof I affix my signature in presence of two witnesses.

SINCLAIR D. G. NILES.

Witnesses:
EDWARD BRADBURY,
GEORGE W. SWANAY.